US011885464B2

(12) United States Patent
Cho et al.

(10) Patent No.: US 11,885,464 B2
(45) Date of Patent: Jan. 30, 2024

(54) LOW PROFILE FLAT BOMBE FOR LPG STORAGE AND METHOD FOR MANUFACTURING THE SAME

(71) Applicants: HYUNDAI MOTOR COMPANY, Seoul (KR); KIA CORPORATION, Seoul (KR); DAE HUNG PRECISION IND'L CO., LTD., Seosan-si (KR)

(72) Inventors: Seong Cheol Cho, Seoul (KR); Sung Won Lee, Hwaseong-si (KR); Ju Tae Song, Hwaseong-si (KR); Seung Hyun Yeo, Gimcheon-si (KR); Duk Hee Park, Pyeongtaek-si (KR)

(73) Assignees: Hyundai Motor Company, Seoul (KR); Kia Corporation, Seoul (KR); DAE Hung Precision Ind'l Co., Ltd., Seonsan-si (KR)

( * ) Notice: Subject to any disclaimer, the term of this patent is extended or adjusted under 35 U.S.C. 154(b) by 29 days.

(21) Appl. No.: 17/533,683

(22) Filed: Nov. 23, 2021

(65) Prior Publication Data

US 2022/0381402 A1 Dec. 1, 2022

(30) Foreign Application Priority Data

May 27, 2021 (KR) ........................ 10-2021-0068155

(51) Int. Cl.
*F17C 3/00* (2006.01)

(52) U.S. Cl.
CPC ........ *F17C 3/00* (2013.01); *F17C 2201/0171* (2013.01); *F17C 2203/013* (2013.01);
(Continued)

(58) Field of Classification Search
CPC .. B60K 15/00; B60K 15/03; B60K 15/03006; B60K 15/067; B60K 15/07;
(Continued)

(56) References Cited

U.S. PATENT DOCUMENTS 6,138,859 A * 10/2000 Aulph .................... B60K 15/03 137/574
2005/0011891 A1* 1/2005 Austerhoff ....... B60K 15/03006 220/4.12
(Continued)

FOREIGN PATENT DOCUMENTS

CN 110385981 A * 10/2019 ............. B60K 15/03
EP 2065245 A1 * 6/2009 ........... B60K 15/077
(Continued)

*Primary Examiner* — Hilary L Gutman
(74) *Attorney, Agent, or Firm* — Morgan, Lewis & Bockius LLP

(57) ABSTRACT

A low profile flat bombe for Liquefied Petroleum Gas (LPG) storage and method for manufacturing the same, may include a flat bombe body including an upper plate having a plurality of first piercing holes and a pump installation hole formed therethrough, a lower plate having a plurality of second piercing holes formed therethrough at positions vertically coinciding with the plurality of first piercing holes, and side plates integrally connecting first and second side end portions of the upper and lower plates, end plates mounted at front and rear openings in the flat bombe body, and support pipes, wherein upper end portions of the support pipes are welded to internal circumferential portions of the plurality of first piercing holes and lower end portions thereof are welded to internal circumferential portions of the plurality of second piercing holes to maintain a vertical distance between the upper and lower plates.

14 Claims, 7 Drawing Sheets

(52) U.S. Cl.
CPC ................ *F17C 2205/0103* (2013.01); *F17C 2205/0305* (2013.01); *F17C 2209/2181* (2013.01); *F17C 2209/221* (2013.01); *F17C 2209/232* (2013.01); *F17C 2221/033* (2013.01); *F17C 2227/0135* (2013.01); *F17C 2270/0168* (2013.01)

(58) Field of Classification Search
CPC .......... B60K 15/073; B60K 2015/0634; B60K 2015/0344; B60K 2015/03243; B60K 2015/03453; B60K 2015/0346; B60K 2015/03013; B60K 2015/03032; F17C 3/00; F17C 2201/0171; F17C 2203/013; F17C 2205/0103; F17C 2205/0305; F17C 2209/2181; F17C 2209/221; F17C 2209/232; F17C 2221/033; F17C 2227/0135; F17C 2270/0168
USPC ........................................................ 410/36
See application file for complete search history.

(56) References Cited

U.S. PATENT DOCUMENTS

| | | | | |
|---|---|---|---|---|
| 2006/0214416 | A1* | 9/2006 | Watanabe | ............ B60K 15/073<br>280/834 |
| 2015/0184803 | A1* | 7/2015 | Jarzynski | ......... B60K 15/03006<br>220/4.01 |
| 2015/0343899 | A1* | 12/2015 | Furusawa | ............ B60K 15/077<br>220/563 |
| 2022/0348074 | A1* | 11/2022 | Vaishnav | ............ B60K 15/077 |

FOREIGN PATENT DOCUMENTS

| | | | | | |
|---|---|---|---|---|---|
| EP | 3667040 | B1 * | 10/2021 | ............. B60K 15/03 |
| WO | WO-2020251001 | A1 * | 12/2020 | ........... B60K 15/077 |

* cited by examiner

[ CROSS-SECTION TAKEN ALONG LINE B-B ]

[ CROSS-SECTION TAKEN ALONG LINE C-C ]

[ CROSS-SECTION TAKEN ALONG LINE D-D ]

LOW PROFILE FLAT BOMBE FOR LPG STORAGE AND METHOD FOR MANUFACTURING THE SAME

CROSS-REFERENCE TO RELATED APPLICATION

The present application claims priority to Korean Patent Application No. 10-2021-0068155 filed on May 27, 2021, the entire contents of which is incorporated herein for all purposes by this reference.

BACKGROUND OF THE INVENTION

Field of the Invention

The present invention relates to a low profile flat bombe for Liquefied Petroleum Gas (LPG) storage and a method for manufacturing the same. More particularly, it relates to a low profile flat bombe for LPG storage which may be easily mounted on an underbody of a vehicle to secure the indoor space of the vehicle and the load space thereof, and a method for manufacturing the same.

Description of Related Art

In a vehicle provided with an LPI engine, a bombe which is a fuel tank configured to supply LPG fuel to an engine is manufactured as a cylinder-type or a donut-type structure, and is provided on the bottom of a trunk or a luggage compartment of the vehicle or on the underbody of the vehicle.

However, because vehicles are manufactured in a structure in which the overall height of a vehicle body is reduced and the center of gravity of the vehicle body is adjusted downwards depending on a vehicle design trend, and the height of the underbody tends to be reduced to secure passenger comfort in the interior of the vehicle (for example, to adjust the hip point of a seat downwards), it is difficult to secure a space for mounting the cylinder-type or donut-type bombe therein.

For example, the cylinder-type bombe has a cylindrical structure with a long length and a large volume and occupies a part of the inner space of a trunk or a luggage compartment, thus substantially reducing the available space in the trunk or the luggage compartment.

Furthermore, in a vehicle body in which the overall height of the vehicle body is reduced, the center of gravity of the vehicle body is adjusted downwards and the height of an underbody is reduced, there is a spatial limitation in installation of the cylinder-type or donut-type bombe on the underbody.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a low profile flat bombe for LPG storage which has a flat structure having a rectangular shape and may thus be easily mounted on the underbody of a vehicle to secure the internal space of the vehicle and the load space thereof, and a method for manufacturing the same.

Various aspects of the present invention are directed to providing a low profile flat bombe for LPG storage including a flat bombe body including an upper plate having a plurality of first piercing holes and a pump installation hole formed therethrough, a lower plate having a plurality of second piercing holes formed therethrough at positions vertically coinciding with the plurality of first piercing holes, and side plates integrally connecting first and second side end portions of the upper plate and the lower plate, end plates mounted at front and rear openings in the flat bombe body, and support pipes, wherein upper end portions of the support pipes are welded to internal circumferential portions of the plurality of first piercing holes and lower end portions thereof are welded to internal circumferential portions of the plurality of second piercing holes to maintain a vertical distance between the upper plate and the lower plate.

In various exemplary embodiments of the present invention, the upper plate and the lower plate may be provided as plate structures configured to have the same area with a greater longitudinal length than a lateral length, and the side plates and the end plates may be provided as curved surface structures configured to be convex outwards and to have a height equal to the vertical distance between the upper plate and the lower plate.

In various exemplary embodiments of the present invention, the longitudinal length or the lateral length of the upper plate and the lower plate may be set to be greater than the height of the side plates and the end plates.

In various exemplary embodiments of the present invention, a flange portion bent towards inside of the flat bombe body to be welded to each of the support pipes may be formed in an internal circumferential portion of each of the plurality of first piercing holes and the plurality of second piercing holes.

In various exemplary embodiments of the present invention, a plurality of baffles having fluid passing holes formed therethrough may be disposed in a predetermined arrangement between support pipes in the flat bombe body, and an upper and a lower end portion of each of the plurality of baffles may be respectively welded to the upper plate and the lower plate.

In various exemplary embodiments of the present invention, each of the plurality of baffles may have a plate structure bent at a designated angle to relieve and distribute stress concentrated on spaces between the neighboring support pipes in the flat bombe body, and may be configured such that lengths and areas of portions of each of the plurality of baffles welded to the upper plate and the lower plate are maximally increased.

In various exemplary embodiments of the present invention, a bead portion configured to have a designated shape convex towards inside of the flat bombe body may be formed on the lower plate at a position vertically coinciding with the pump installation hole of the upper plate.

In various exemplary embodiments of the present invention, a boss portion configured to secure a space for installation of a pump may be welded to the pump installation hole of the upper plate, and at least two reinforcing blades configured to support and protect the pump may be connected to a lower end portion of the boss portion welded to the pump installation hole of the upper plate and to the bead portion of the lower plate by welding.

In various exemplary embodiments of the present invention, a reinforcing rib may be connected to the at least two reinforcing blades by welding.

In various exemplary embodiments of the present invention various exemplary embodiments of the present invention, a reinforcing steel pipe to relieve local stress may be located at a central region between the upper plate and the lower plate, and may be welded to the upper plate and the bead portion of the lower plate.

In various exemplary embodiments of the present invention various exemplary embodiments of the present invention, a plurality of mounting brackets configured to be fixedly assembled with a vehicle body may be mounted on the flat bombe body and the end plates.

Various aspects of the present invention are directed to providing a method for manufacturing a low profile flat bombe for LPG storage, the method including preparing a plate body having a designated area, forming a plurality of first piercing holes and a pump installation hole through one side region of the plate body used as an upper plate, and simultaneously, forming a plurality of second piercing holes through a remaining side region of the plate body used as a lower plate, using piercing and drawing, bending both side end portions of the plate body to form side plates, preparing a flat bombe body including the upper plate configured to have the plurality of first piercing holes and the pump installation hole formed therethrough, the lower plate configured to have the plurality of second piercing holes formed therethrough at positions vertically coinciding with the plurality of first piercing holes, and the side plates integrally connecting first and second side end portions of the upper plate and the lower plate by welding the bent side end portions of the bent plate body, welding end plates to front and rear openings of the flat bombe body, and welding upper end portions of support pipes, configured to connect the upper plate and the lower plate to each other and to maintain a vertical distance between the upper plate and the lower plate, to internal circumferential portions of the plurality of first piercing holes, and simultaneously, welding lower end portions of the support pipes to internal circumferential portions of the plurality of second piercing holes.

In various exemplary embodiments of the present invention, the method may further include, before the welding the end plates to the front and rear openings, welding upper end portions and lower end portions of baffles, configured to have fluid passing holes, to the upper plate and the lower plate in spaces between neighboring support pipes among an internal space of the flat bombe body.

In various exemplary embodiments of the present invention, the method may further include, before welding the end plates to the front and rear openings, welding a boss portion configured to secure a space for installation of a pump to the pump installation hole of the upper plate, and welding at least two reinforcing blades configured to support and protect the pump to the boss portion and the lower plate.

In various exemplary embodiments of the present invention, the method may further include assembling a pump assembly into the boss portion and the reinforcing blades.

Other aspects and exemplary inventions of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
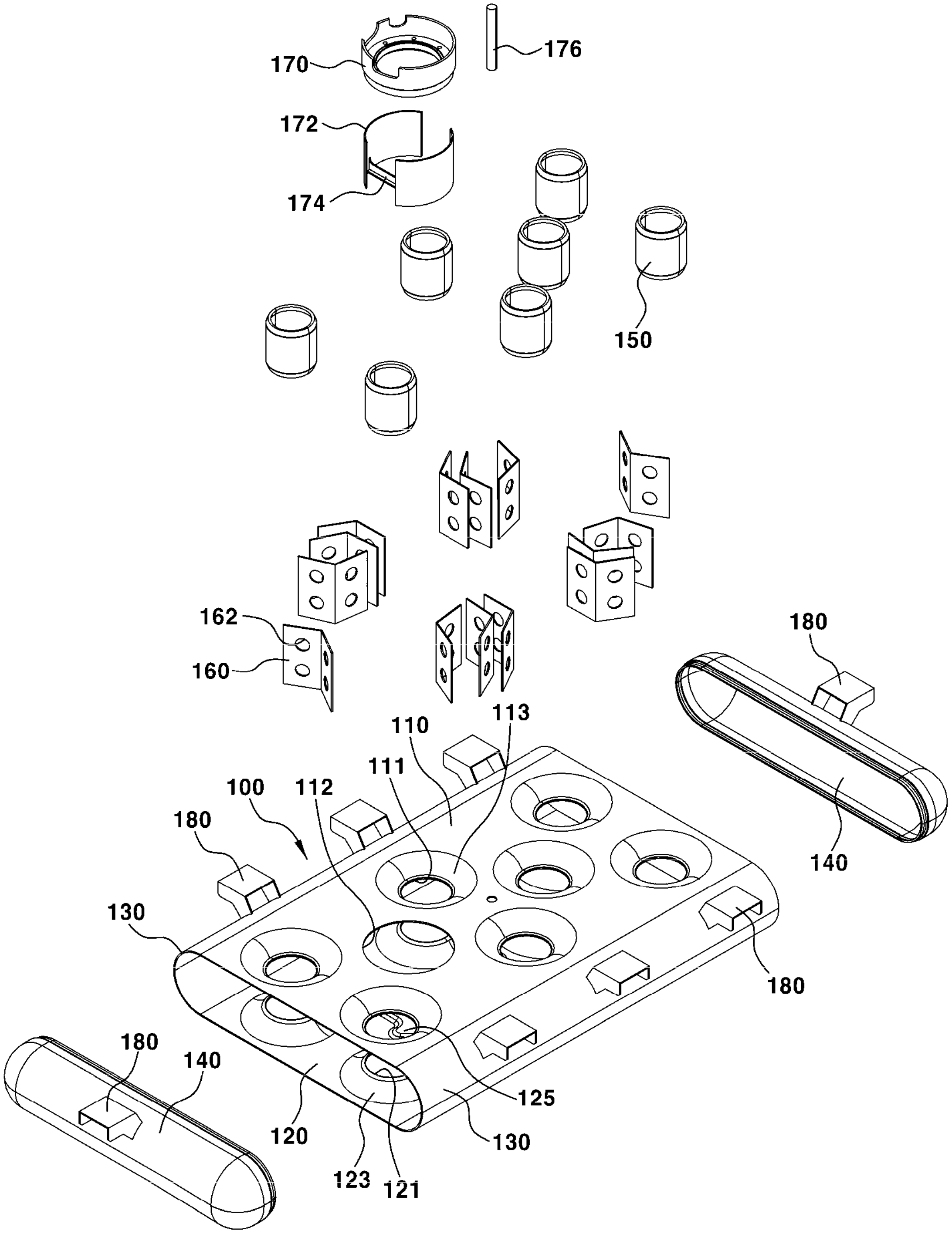
FIG. 1 is an exploded perspective view exemplarily illustrating a low profile flat bombe for LPG storage according to various exemplary embodiments of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the other hand, the present invention is intended to cover not only the exemplary embodiments of the present invention, but also various alternatives, modifications, equivalents and other embodiments, which may be included within the spirit and scope of the present invention as defined by the appended claims.

Figure 2:
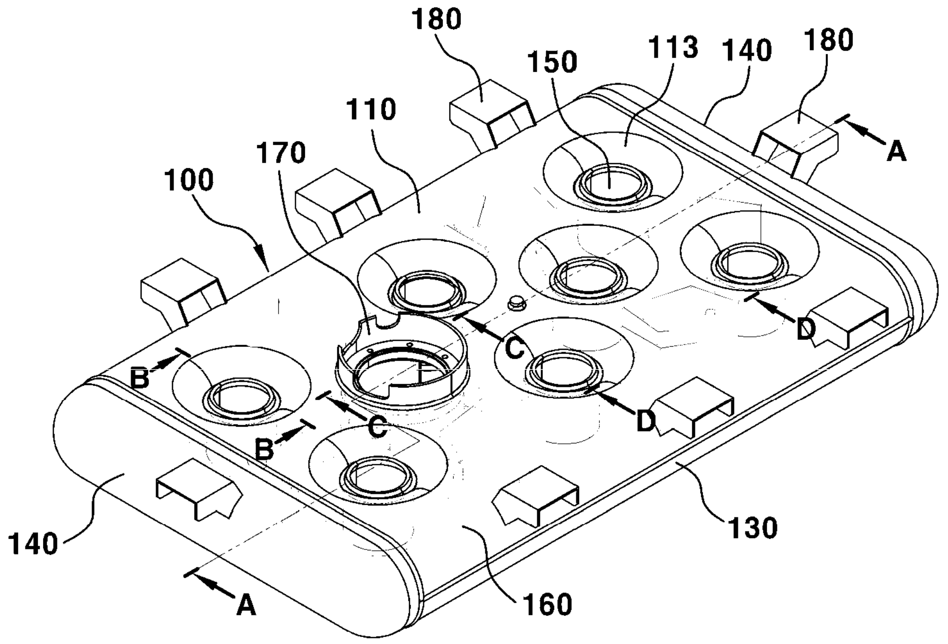
FIG. 2 is an assembled perspective view exemplarily illustrating the low profile flat bombe for LPG storage according to various exemplary embodiments of the present invention.
Figure 3:
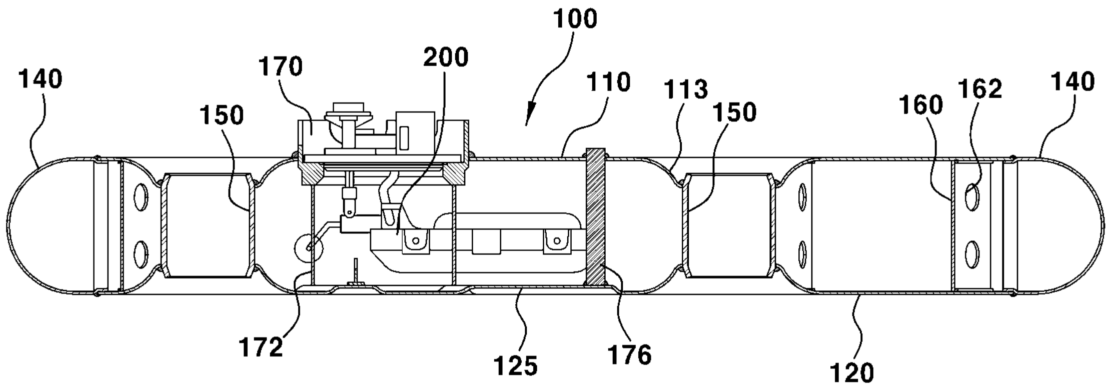
FIG. 3 is a cross-sectional view exemplarily illustrating the low profile flat bombe for LPG storage according to various exemplary embodiments of the present invention.

FIG. 1, FIG. 2, and FIG. 3 illustrate a low profile flat bombe for LPG storage according to various exemplary embodiments of the present invention and in these figures, reference numeral 100 indicates a flat bombe body.

As shown in FIG. 1, FIG. 2, and FIG. 3, the flat bombe body 100 includes an upper plate 110 configured to have a plurality of first piercing holes 111 and a pump installation hole 112 formed therethrough, a lower plate 120 configured to have a plurality of second piercing holes 121 formed therethrough at positions vertically coinciding with the first piercing holes 111, and side plates 130 configured to integrally connect both side end portions of the upper plate 110 and the lower plate 120.

Furthermore, end plates 140, which provide a closed space configured to charge the flat bombe with LPG and are configured to prevent backward flow or overflow of LPG, are welded to front and rear openings of the flat bombe body 100.

The flat bombe body 100 must be easily mounted on the underbody of a vehicle, which has a reduced overall height and the center of gravity adjusted downwards and has the reduced height of the underbody, without a spatial limitation.

For the present purpose, the upper plate 110 and the lower plate 120 are provided as plate structures having the same area which have a greater longitudinal length than a lateral length, and the side plates 130 and the end plates 140 are provided as curved surface structures which have the same height as a vertical distance between the upper plate 110 and the lower plate 120 and are convex outwards.

Furthermore, because the longitudinal length or the lateral length of the upper plate 110 and the lower plate 120 is set to be greater than the height of the side plates 130 and the end plates 140 so that the flat bombe body 100 is manufactured in a flat rectangular shape, the flat bombe body 100 may be easily mounted on the underbody of the vehicle without a spatial limitation, and thus, a large internal space of the vehicle and a large load space thereof may be secured.

In the flat bombe body 100, the upper plate 110 and the lower plate 120 must not be deformed to easily endure the internal pressure of the flat bombe charged with LPG, and the constant vertical distance between the upper plate 110 and the lower plate 120 must be maintained.

For the present purpose, a plurality of support pipes 150 is provided between the upper plate 110 and the lower plate 120.

Figure 4:
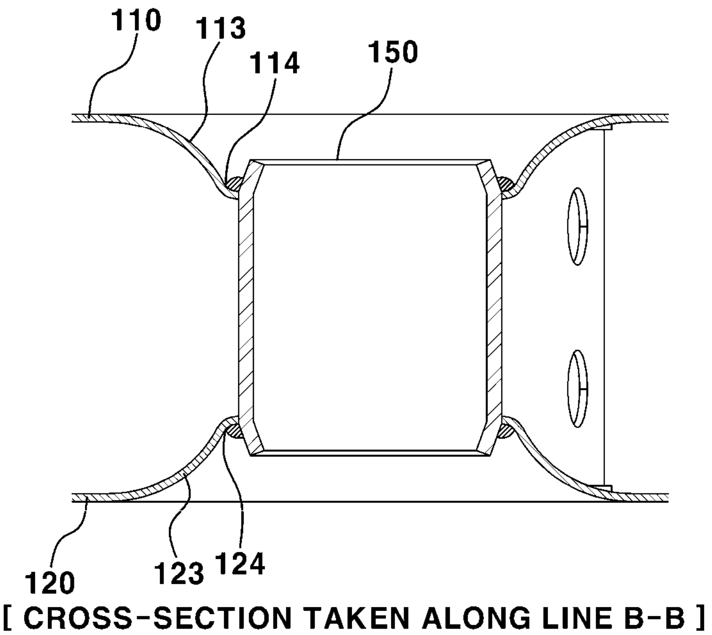
FIG. 4 is a cross-sectional view exemplarily illustrating a support pipe in a welded state among elements of the low profile flat bombe for LPG storage according to various exemplary embodiments of the present invention.
Figure 5:
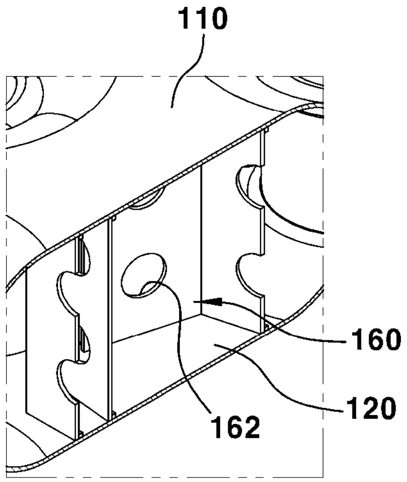
FIG. 5 is a perspective cross-sectional view exemplarily illustrating a baffle in a welded state among the elements of the low profile flat bombe for LPG storage according to various exemplary embodiments of the present invention.

More concretely, as shown in FIG. 4, the external diameter portion of the upper end portion of the support pipe 150 is attached and welded to the internal circumferential portion of the first piercing hole 111 of the upper plate 110, and the external diameter portion of the lower end portion of the support pipe 150 is attached and welded to the internal circumferential portion of the second piercing hole 121 of the lower plate 120.

Here, flange portions 113 and 123, which are bent toward the inside of the flat bombe body 100 to be welded to the support pipes 150, are formed in the internal circumferential portions of the first piercing holes 111 and the second piercing holes 121 by drawing.

Therefore, as show in FIG. 4, concave valleys 114 and 124 externally exposed are formed as spaces, in which welding is easily performed, at a contact region between the external diameter portion of the upper end portion of the support pipe 150 and the flange portion 113 in the internal circumferential portion of the first piercing hole 111 and a contact region between the external diameter portion of the lower end portion of the support pipe 150 and the flange portion 123 in the internal circumferential portion of the second piercing hole 121.

Therefore, equipment, such as a welding gun, may easily approach the valleys 114 and 124, being capable of easily performing welding.

Accordingly, the support pipes 150 are integrally connected to the upper plate 110 and the lower plate 120 by welding and thus serve to securely fix the upper plate 110 and the lower plate 120 and to maintain the constant vertical distance between the upper plate 110 and the lower plate 120, and consequently, the upper plate 110 and the lower plate 120 are not deformed by the internal pressure of the flat bombe charged with LPG.

A plurality of baffles 160, each of which includes a plate body bent at a designated angle and fluid passing holes 162 formed therethrough, is disposed in a designated arrangement in spaces between the neighboring support pipes 150 among the internal space of the flat bombe body 100, and the upper end portion and the lower end portion of each of the baffles 160 are attached and welded to the lower surface of the upper plate 110 and the upper surface of the lower plate 120.

Therefore, the respective baffles 160 are configured to reduce the velocity of fluid, such as LPG, and noise caused thereby while allowing the flow of the fluid through the fluid passing holes 162, and are also configured to distribute stress applied to the upper plate 110 and the lower plate 120 because the baffles 160 are connected to the upper plate 110 and the lower plate 120 by welding.

Furthermore, when the upper end portion and the lower end portion of each of the baffles 160 are attached and welded to the lower surface of the upper plate 110 and the upper surface of the lower plate 120, the welding sections of each of the baffles 160 may be formed to have a length as long as possible to relieve stress applied to the flat bombe.

More concretely, each of the baffles 160 may have a plate structure bent at a designated angle to relieve and distribute stress concentrated on the spaces between the neighboring support pipes 150 among the internal space of the flat bombe body 100, and be configured such that the lengths and areas of portions of the baffle 160 welded to the upper plate 110 and the lower plate 120 are maximally increased.

A pump assembly 200 configured to supply LPG to an engine of the vehicle is provided inside and outside the flat baffle body 100.

For the present purpose, the pump installation hole 112 is formed through the upper plate 110, and a bead portion 125 having a designated shape, which is convex toward the inside of the flat bombe body 100, is formed on the lower plate 120 at a position vertically coinciding with the pump installation hole 112.

Here, the bead portion 125, which is a kind of reinforcing structure against the load of the pump assembly 200, is formed to be convex using a press used to manufacture the upper plate 110 and the lower plate 120, and in the instant housing, the bead portion 125 is formed as having a loop-type profile to surround the circumference of the lower end portion of the pump assembly 200.

Figure 6:
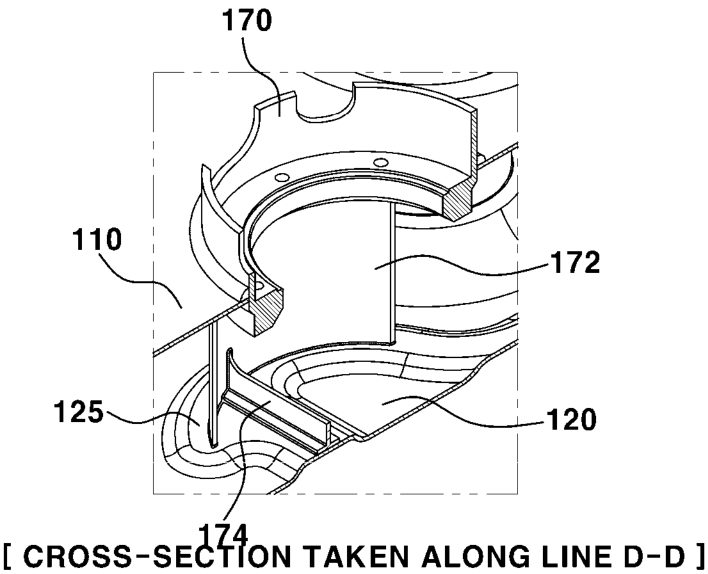
FIG. 6 is a perspective cross-sectional view exemplarily illustrating a boss portion and a reinforcing blade in a welded state among the elements of the low profile flat bombe for LPG storage according to various exemplary embodiments of the present invention.

Furthermore, as shown in FIG. 6, a cylindrical boss portion 170 configured to secure a space for installation of the pump assembly 200 is welded to the inlet of the pump installation hole 112 of the upper plate 110, and two or more curved-type reinforcing blades 172 configured to support and protect a pump are connected to the lower end portion of the boss portion 170 welded to the pump installation hole 112 of the upper plate 110 and to the bead portion 125 of the lower plate 120 by welding.

A reinforcing rib 174 is further connected to the two or more reinforcing blades 172 by welding.

Therefore, when the pump assembly 200 enters the inside of the flat bombe body 100 through the pump installation hole 112 and is mounted in the bead portion 125 of the lower plate 120, the circumference of the pump assembly 200 may be supported by the boss portion 170 and the reinforcing blades 172, deformation of the reinforcing blades 172 may be prevented by the reinforcing rib 174 even though the load of the pump and stress are transmitted to the reinforcing blades 172, and deformation of the lower plate 120 on which the load of the pump assembly 200 and the stress are concentrated may be prevented by the bead portion 125 provided as a reinforcing structure formed on the lower plate 120.

Figure 7:
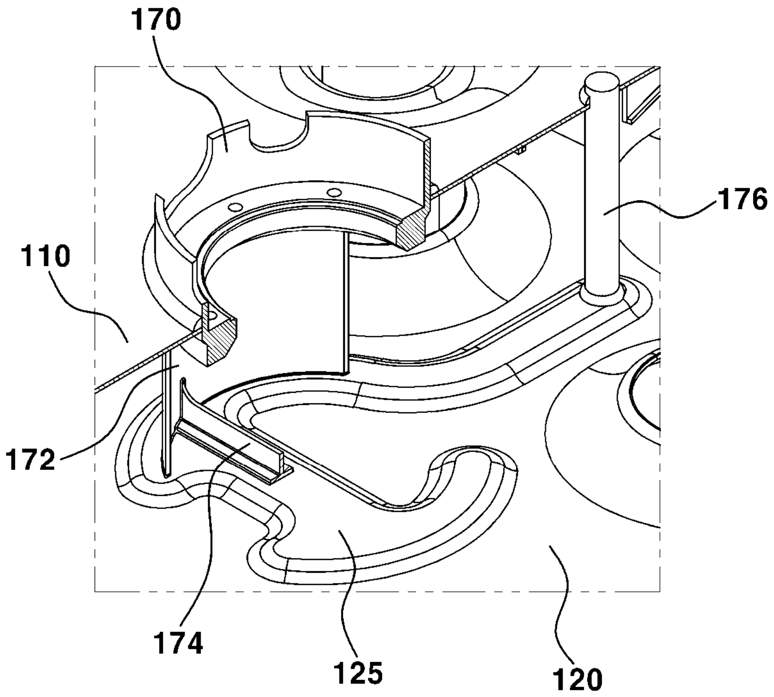
FIG. 7 is a perspective cross-sectional view exemplarily illustrating a reinforcing steel pipe in a welded state among the elements of the low profile flat bombe for LPG storage according to various exemplary embodiments of the present invention.

The flat bombe body 100 has a rectangular shape as seen from above, local stress may be concentrated on a central region between the upper plate 110 and the lower plate 120, and to solve the present concentration, a separate reinforcing steel pipe 176 may be located between the upper plate 110 and the lower plate 120 and connected to the lower surface of the upper plate 110 and the bead portion 125 of the lower plate 120 by welding, as shown in FIG. 7.

A plurality of mounting brackets 180 configured to be fixedly assembled with a vehicle body is mounted on the external surfaces of both sides of the flat bombe body 100 and the external surfaces of the end plates 140 in a designated arrangement by welding.

Figure 13:
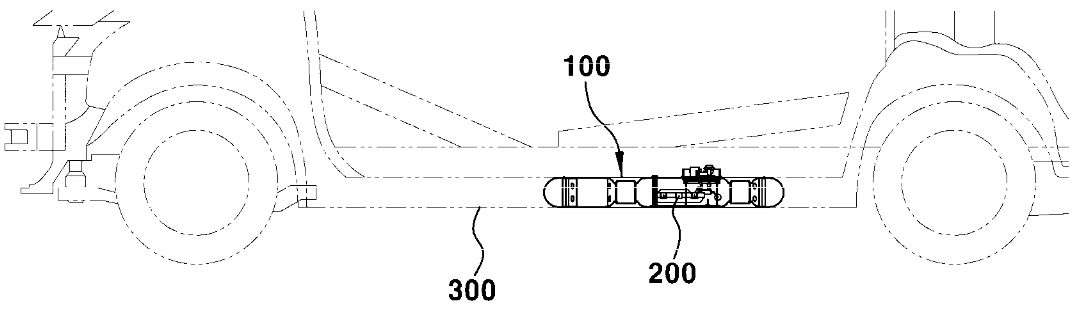
FIG. 13 is a schematic view exemplarily illustrating the provided position and state of the low profile flat bombe for LPG storage according to various exemplary embodiments of the present invention.

Accordingly, the low profile flat bombe according to various exemplary embodiments of the present invention is manufactured to have a structure having a low height and a large area, compared to the conventional cylinder-type or donut-type bombe, and may thus be easily mounted on an underbody 300 of a vehicle, as shown in FIG. 13, and thereby, a large internal space of the vehicle and a large load space thereof may be secured.

Furthermore, in a vehicle body having a reduced overall height and the center of gravity which is adjusted downwards, and including the underbody 300 having a reduced height, the low profile flat bombe for LPG storage according to various exemplary embodiments of the present invention may be easily mounted on the underbody 300 without a spatial limitation.

Hereinafter, a method for manufacturing the flat bombe having the above-described configuration according to various exemplary embodiments of the present invention will be described.

FIG. 8, FIG. 9, FIG. 10, FIG. 11 and FIG. 12 are perspective views exemplarily illustrating a process for the manufacturing low profile flat bombe for LPG storage according to various exemplary embodiments of the present invention in order.

First, a metal plate body having a designated area is prepared.

Thereafter, using piercing and drawing, a plurality of first piercing holes 111 and the pump installation hole 112 are formed through one side region of the metal plate body which will be used as the upper plate 110, and simultaneously a plurality of second piercing holes 112 is formed through the other side region of the metal plate body which will be used as the lower plate 120, and then both side end portions of the metal plate body are bent to form side plates 130.

Figure 8:
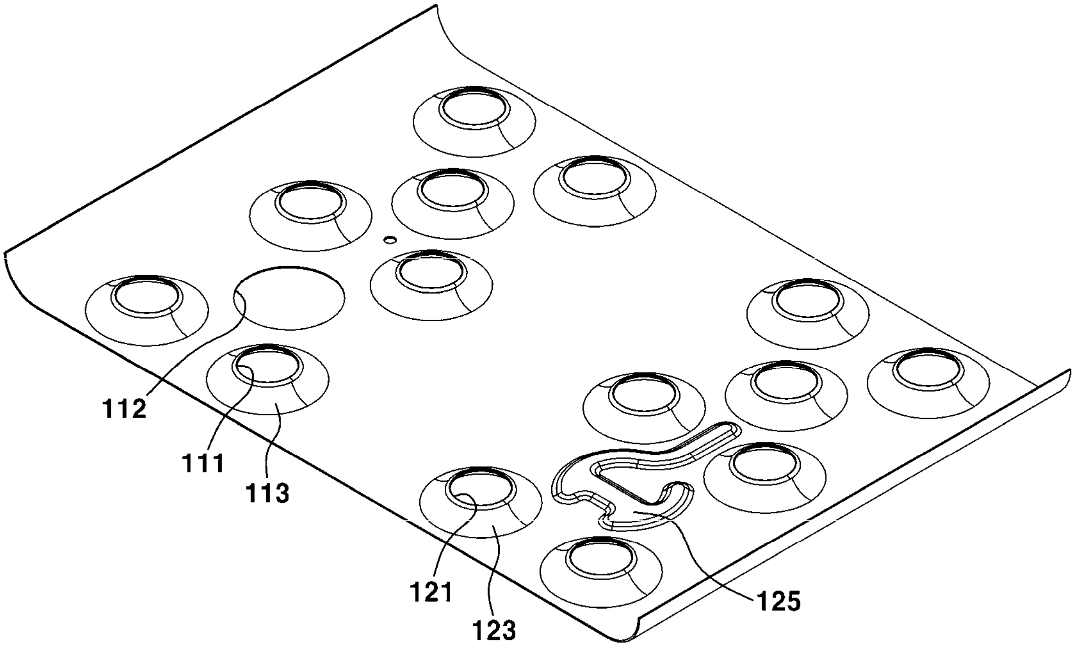
FIG. 8, FIG. 9, FIG. 10, FIG. 11 and FIG. 12 are perspective views exemplarily illustrating a process for manufacturing the low profile flat bombe for LPG storage according to various exemplary embodiments of the present invention in order.

Therefore, to prepare the flat bombe body 100, the first piercing holes 111 and the pump installation hole 112 may be formed through one side region of the metal plate body which will be used as the upper plate 110 and the second piercing holes 112 may be formed through the other side region of the metal plate body which will be used as the lower plate 120 simultaneously, and both side end portions of the metal plate body are bent into a curved type to form the side plates 130, by performing piecing and drawing on the metal plate body having the designated area, as shown in FIG. 8.

Figure 9:
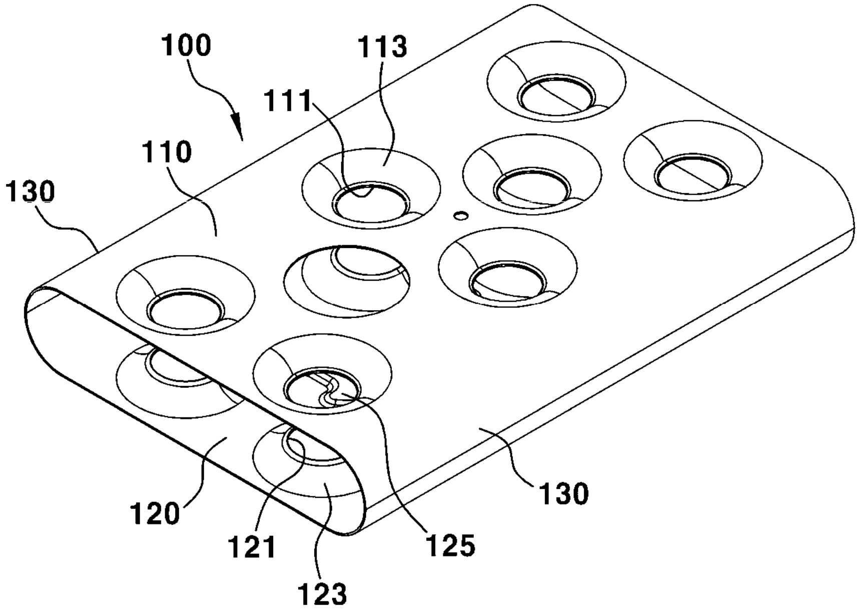

Thereafter, preparation of the flat bombe body 100 including the upper plate 110 having the first piercing holes 111 and the pump installation hole 112 formed therethrough, the lower plate 120 having the second piercing holes 121 formed therethrough at positions vertically coinciding with the first piercing holes 111, and the side plates 130 integrally connecting both side end portions of the upper plate 110 and the lower plate 120 may be completed by welding the bent side end portions of the metal plate body, as shown in FIG. 9.

Here, the baffles 160, the boss portion 170, etc. may be easily placed into the flat bombe body 100 through the front and rear openings of the flat bombe body 100.

Figure 10:
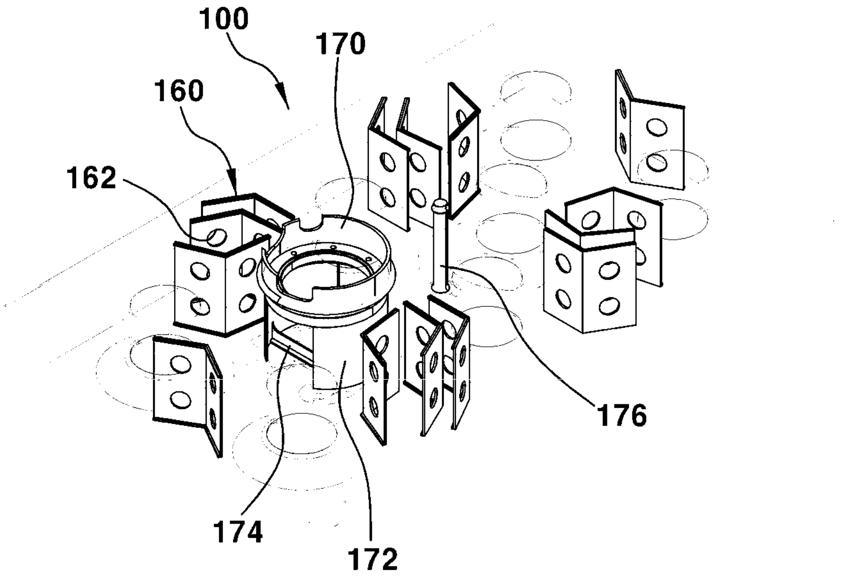

Thereafter, the upper end portions and the lower end portions of the baffles 160 having the fluid passing holes 162 are welded to the lower surface of the upper plate 110 and the upper surface of the lower plate 120 in spaces between the neighboring support pipes 150, which will be mounted in a subsequent operation, among the internal space of the flat bombe body 100, as shown in FIG. 10.

Furthermore, the boss portion 170 configured to secure a space for installation of the pump assembly 200 is welded to the pump installation hole 112 of the upper plate 110, and two or more reinforcing blades 172 configured to support and protect the pump are welded to the lower end portion of the boss portion 170 and the bead portion 125 of the lower plate 120.

Here, the reinforcing rib 174 may be further welded to the two or more reinforcing blades 172, and the reinforcing steel pipe 176 may be welded to the tower surface of the upper plate 110 and the bead portion 125 of the lower plate 120.

Figure 11:
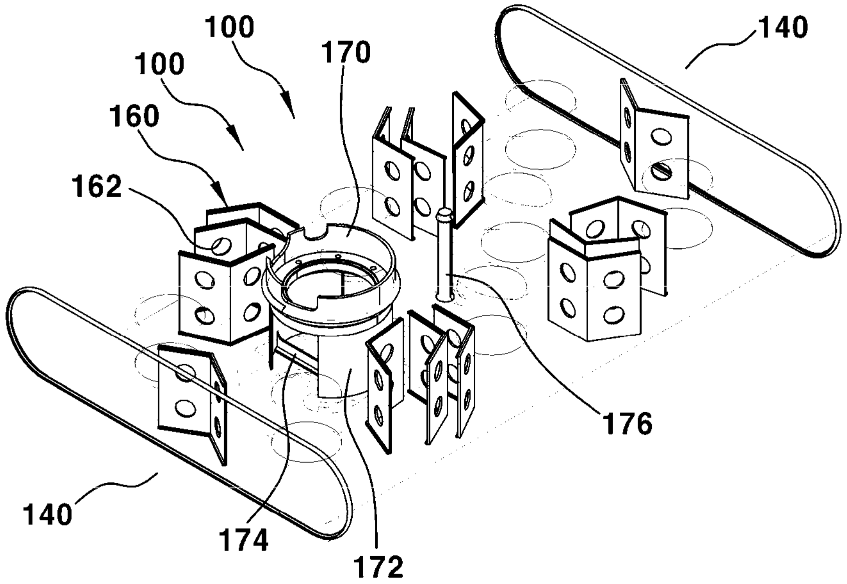

Thereafter, the end plates 140 are welded to the front and rear openings of the flat bombe body 100, as shown in FIG. 11.

Figure 12:
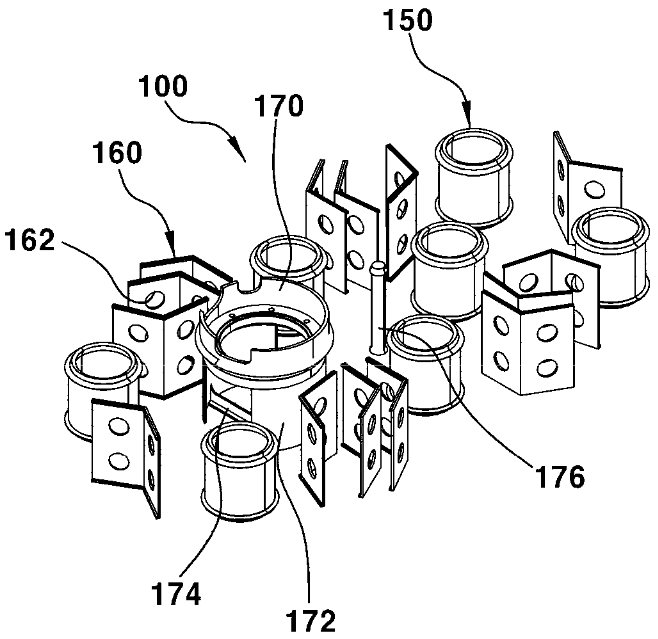

Thereafter, the support pipes 150 configured to connect the upper plate 110 and the lower plate 120 to each other and to maintain the vertical distance between the upper plate 110 and the lower plate 120 are inserted into and then welded to the first piercing holes 111 of the upper plate 110 and the second piercing holes 121 of the lower plate 120, as shown in FIG. 12.

That is, the external diameter portions of the upper end portions of the support pipes 150 are attached and welded to the internal circumferential portions of the first piercing holes 111, and the external diameter portions of the lower end portions of the support pipes 150 are attached and welded to the internal circumferential portions of the second piercing holes 121, securely supporting the upper plate 110 and the lower plate 120 and maintaining the constant vertical distance between the upper plate 110 and the lower plate 120.

Finally, the pump assembly 200 is assembled into the boss portion 170 and the reinforcing blades 172.

That is, when the pump assembly 200 is inserted into the flat bombe body 100 through the pump installation hole 112 and is mounted in the bead portion 125 of the lower plate 120, the circumference of the pump assembly 200 may be supported by the boss portion 170 and the reinforcing blades 172.

Accordingly, the low profile flat bombe according to various exemplary embodiments of the present invention having a structure which has a low height and a large area, compared to the conventional cylinder-type or donut-type bombe, may be easily manufactured.

As is apparent from the above description, a low profile flat bombe for LPG storage and a method for manufacturing the same according to various exemplary embodiments of the present invention are directed to providing the following effects.

First, the low profile flat bombe for LPG storage according to various exemplary embodiments of the present invention has a flat structure having a rectangular shape and may thus be easily mounted on the underbody of a vehicle, being configured for securing a large internal space of the vehicle and a large load space thereof.

Second, in a vehicle body having a reduced overall height and the center of gravity which is adjusted downwards, and including an underbody having a reduced height, the low profile flat bombe for LPG storage according to various exemplary embodiments of the present invention may be easily mounted on the underbody without a spatial limitation.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A low profile flat bombe for Liquefied Petroleum Gas (LPG) storage, the low profile flat bombe comprising:

a flat bombe body including:

an upper plate having a plurality of first piercing holes and a pump installation hole formed through the upper plate;

a lower plate having a plurality of second piercing holes formed through the lower plate at positions vertically corresponding to the plurality of first piercing holes; and side plates integrally connecting first and second side end portions of the upper plate and the lower plate;

end plates mounted at a front opening and a rear opening of the flat bombe body; and support pipes, wherein upper end portions of the support pipes are attached to internal circumferential portions of the plurality of first piercing holes and lower end portions thereof are attached to internal circumferential portions of the plurality of second piercing holes to maintain a vertical distance between the upper plate and the lower plate.

2. The low profile flat bombe of claim 1, wherein the upper plate and the lower plate are provided to have a same area with a longitudinal length greater than a lateral length, and the side plates and the end plates are curved to be convex outwards therefrom and to have a height equal to the vertical distance between the upper plate and the lower plate.

3. The low profile flat bombe of claim 2, wherein the longitudinal length or the lateral length of the upper plate and the lower plate is greater than the height of the side plates and the end plates.

4. The low profile flat bombe of claim 1, wherein a flange portion bent towards an inside of the flat bombe body to be attached to each of the support pipes is formed in the internal circumferential portion of each of the plurality of first piercing holes and the plurality of second piercing holes.

5. The low profile flat bombe of claim 4, further including concave valleys at a contact region between an external diameter portion of the upper end portions of the support pipes and the flange portion in the internal circumferential portions of the plurality of first piercing holes and a contact region between an external diameter portion of the lower end portions of the support pipes and the flange portion in the internal circumferential portions of the plurality of second piercing holes.

6. The low profile flat bombe of claim 1, wherein a plurality of baffles having fluid passing holes formed therethrough is disposed between the support pipes in the flat bombe body, and wherein an upper end portion and a lower end portion of each of the plurality of baffles are respectively attached to the upper plate and the lower plate.

7. The low profile flat bombe of claim 6, wherein each of the plurality of baffles is bent to relieve and distribute stress concentrated on spaces between neighboring support pipes in the flat bombe body.

8. The low profile flat bombe of claim 7, wherein each of the plurality of baffles is formed to have lengths and areas of portions of each of the plurality of baffles attached to the upper plate and the lower plate.

9. The low profile flat bombe of claim 1, wherein a bead portion which is convex towards an inside of the flat bombe body is formed on the lower plate at a position vertically coinciding with the pump installation hole of the upper plate.

10. The low profile flat bombe of claim 9, wherein a boss portion for securing a space for installation of a pump is attached to the pump installation hole of the upper plate.

11. The low profile flat bombe of claim 10, wherein at least two reinforcing blades configured to support and protect the pump are connected to a lower end portion of the boss portion attached to the pump installation hole of the upper plate and to the bead portion of the lower plate.

12. The low profile flat bombe of claim 11, wherein a reinforcing rib is connected to the at least two reinforcing blades.

13. The low profile flat bombe of claim 9, wherein a reinforcing pipe to relieve local stress is located at a central region between the upper plate and the lower plate, and is attached to the upper plate and the bead portion of the lower plate.

14. The low profile flat bombe of claim 1, wherein a plurality of mounting brackets configured to be fixedly assembled with a vehicle body are mounted on the flat bombe body and the end plates.

* * * * *